United States Patent
Gibbs et al.

(10) Patent No.: US 9,236,749 B2
(45) Date of Patent: Jan. 12, 2016

(54) VEHICLE BATTERY SYSTEM BALANCING SYSTEMS AND METHODS

(71) Applicant: GM GLOBAL TECHNOLOGY OPERATIONS LLC, Detroit, MI (US)

(72) Inventors: James C. Gibbs, Brighton, MI (US); Rory B. Fraga, Troy, MI (US)

(73) Assignee: GM GLOBAL TECHNOLOGY OPERATIONS LLC, Detroit, MI (US)

( * ) Notice: Subject to any disclaimer, the term of this patent is extended or adjusted under 35 U.S.C. 154(b) by 354 days.

(21) Appl. No.: 13/858,769

(22) Filed: Apr. 8, 2013

(65) Prior Publication Data

US 2014/0300323 A1  Oct. 9, 2014

(51) Int. Cl.
 *H02J 7/00* (2006.01)
 *G01R 31/36* (2006.01)
 *B60L 11/18* (2006.01)

(52) U.S. Cl.
 CPC ........... *H02J 7/0014* (2013.01); *B60L 11/1862* (2013.01); *B60L 11/1866* (2013.01); *B60L 2240/545* (2013.01); *B60L 2240/547* (2013.01); *B60L 2240/549* (2013.01); *Y02T 10/7055* (2013.01)

(58) Field of Classification Search
 CPC ............... H02J 7/0014; B60L 11/1862; B60L 11/1866; B60L 2240/545; B60L 2240/547; B60L 2240/549; Y02T 10/7055
 USPC ................. 320/116, 118–119; 702/63, 64, 65
 See application file for complete search history.

(56) References Cited

U.S. PATENT DOCUMENTS

| | | | |
|---|---|---|---|
| 5,659,237 A * | 8/1997 | Divan | H02J 7/0018 320/119 |
| 5,848,380 A * | 12/1998 | Arai et al. | 702/64 |
| 7,193,391 B2 * | 3/2007 | Moore | 320/116 |
| 8,513,918 B2 * | 8/2013 | Ueda et al. | 320/116 |
| 8,924,056 B2 * | 12/2014 | Chorian et al. | 701/22 |
| 8,935,043 B2 * | 1/2015 | Li et al. | 701/34.4 |
| 2001/0033150 A1 * | 10/2001 | Kimura et al. | 320/132 |
| 2002/0171397 A1 * | 11/2002 | Adrian et al. | 320/119 |
| 2010/0052614 A1 * | 3/2010 | Mariels | 320/116 |
| 2010/0121511 A1 * | 5/2010 | Onnerud et al. | 701/22 |
| 2011/0012560 A1 * | 1/2011 | Sakakibara | 320/118 |
| 2011/0241622 A1 * | 10/2011 | Li et al. | 320/116 |
| 2011/0254502 A1 * | 10/2011 | Yount et al. | 320/107 |
| 2011/0254508 A1 * | 10/2011 | Sakakibara | 320/118 |
| 2012/0065824 A1 * | 3/2012 | Takahashi et al. | 701/22 |
| 2013/0020997 A1 * | 1/2013 | Iwasawa et al. | 320/116 |
| 2013/0099746 A1 * | 4/2013 | Nork et al. | 320/118 |
| 2014/0145678 A1 * | 5/2014 | Hwang | 320/118 |
| 2014/0217982 A1 * | 8/2014 | Ohkawa et al. | 320/118 |
| 2014/0266221 A1 * | 9/2014 | Baughman et al. | 324/426 |

* cited by examiner

*Primary Examiner* — M'Baye Diao
(74) *Attorney, Agent, or Firm* — Phillips Ryther & Winchester; John P. Davis (57) ABSTRACT

System and methods for balancing a vehicle battery system are presented. In certain embodiments, a method for balancing a vehicle battery system including a plurality of sections may include calculating a plurality of quanta of energy required for each of the plurality of sections to reaching a balancing point. Based at least in part on the calculated plural of quanta of energy, it may be determined that the plurality of sections of the battery system are unbalanced. To balance the battery system, a balancing system may be selectively actuated to change the amounts of energy stored in one or more of the plurality of cells such that the plurality of quanta of energy are within a particular range.

16 Claims, 4 Drawing Sheets

VEHICLE BATTERY SYSTEM BALANCING SYSTEMS AND METHODS

TECHNICAL FIELD

This disclosure relates to systems and methods for balancing a battery system in a vehicle. More specifically, but not exclusively, this disclosure relates to systems and methods for balancing sections of a battery pack based on a determined state of charge of the various sections.

BACKGROUND

Passenger vehicles often include electric batteries for operating features of a vehicle's electrical and drivetrain systems. For example, vehicles commonly include a 12V lead-acid automotive battery configured to supply electric energy to vehicle starter systems (e.g., a starter motor), lighting systems, and/or ignition systems. In electric, fuel cell ("FC"), and/or hybrid vehicles, a high voltage ("HV") battery system may be used to power electric drivetrain components of the vehicle (e.g., electric drive motors and the like).

In certain designs, battery systems included in a vehicle may include one or more sections. For example, a vehicle battery system may include a battery pack that comprises one or more sections of battery cells. Over extended periods of use, different battery sections may develop differences in capacities, states of charge, discharge rates, impedances, and/or voltages. Similarly, a battery cell or a battery section may be replaced and/or added, resulting in differences capacities, states of charge, discharge rates, impedances, and/or voltages between the new battery cell or section and the existing battery cells or sections.

SUMMARY

Systems and methods are presented for balancing one or more sections of a battery system included in a vehicle. In certain embodiments, a system for battery balancing may include a battery system including a plurality of battery sections. Each section of the plurality of battery sections may include a plurality of cells. A plurality of sensors may be coupled to the plurality of sections and may be configured to measure electrical parameters of each of the plurality of sections. The electrical parameters may be used to determine other characteristics, such as a state of charge. A cell balancing system may be coupled to the plurality of sections and be configured to selectively charge, discharge, and/or redistribute energy between the cells of the sections. Battery control electronics may be coupled to the plurality of sensors and the cell balancing system. Consistent with embodiments disclosed herein, the battery control electronics may be configured to cause the cell balancing system to balance the battery sections according to a desired state of charge balance point.

In certain embodiments, a method for balancing a plurality of sections included in a battery system may include receiving a state of charge of each of the plurality of sections. States of charge may be determined based on information provided by one or more sensors associated with one or more of the battery sections. A quantum of energy to reach a desired state of charge balance point may be calculated based on individual section capacities for each of the plurality of sections. In certain embodiments, a quantum of energy may be expressed in terms of ampere-hours ("AHr") required to reach the desired state of charge balance point. In some embodiments, the calculated quanta of energy may be calculated according to the capacity of a battery section multiplied by the difference between a desired state of charge balance point and a present measured state of charge. Based on the measured states of charge and/or the calculated quanta of energy, it may be determined that the battery is unbalanced. In certain embodiments, determining whether the battery is unbalanced may include comparing the measured states of charge and/or the calculated quanta of energy of each section. If the sections differ by an amount exceeding a threshold, the battery may be unbalanced.

If the battery is unbalanced, a quantum of energy of one or more battery sections may be identified having calculated quanta for the one or more battery sections to reach the desired state of charge balance point that are different (e.g., greater or smaller) than other battery sections. For example, in a battery having three sections, a first section and a second section may be associated with the same quantum of energy required to reach a desired balance point, while a third section may be associated with a smaller quantum of energy required to reach the desired balance point. The battery sections may be either charged and/or discharged, such that when the battery sections are connected to a charging source, they each reach a state of charge balance point at approximately the same time. In some embodiments, the state of charge balance point may be a charge termination point for a battery and/or its constituent sections. In other words, each section may obtain from the charging source a particular quantum of energy to bring the section to a charge termination point at approximately the same time as other sections. In this way, the time needed to charge each section to the charge termination point is equalized across battery sections having differing charging characteristics. Accordingly, the charging process may be optimized to allow the battery system to absorb a maximum amount of charge in a given period of time. For example, in the above-described three-section battery system, the third section may be discharged to a level where the first, second, and third sections all are associated the same quantum of energy required to reach the desired balancing point. In this manner, upon charging of the battery system to the desired state of charge balancing point (e.g., a charge termination level), all sections of the battery system will be at or near the balancing point and the battery system will be balanced in terms of the time needed to charge each battery section to the charge termination level. In certain embodiments, this may be associated with all sections of the battery system being at their fully charged state.

BRIEF DESCRIPTION OF THE DRAWINGS

Non-limiting and non-exhaustive embodiments of the disclosure are described, including various embodiments of the disclosure with reference to the figures, in which.

DETAILED DESCRIPTION

A detailed description of systems and methods consistent with embodiments of the present disclosure is provided below. While several embodiments are described, it should be understood that the disclosure is not limited to any one embodiment, but instead encompasses numerous alternatives, modifications, and equivalents. In addition, while numerous specific details are set forth in the following description in order to provide a thorough understanding of the embodiments disclosed herein, some embodiments can be practiced without some or all of these details. Moreover, for the purpose of clarity, certain technical material that is known in the related art has not been described in detail in order to avoid unnecessarily obscuring the disclosure.

The embodiments of the disclosure will be best understood by reference to the drawings, wherein like parts may be designated by like numerals. The components of the disclosed embodiments, as generally described and illustrated in the figures herein, could be arranged and designed in a wide variety of different configurations. Thus, the following detailed description of the embodiments of the systems and methods of the disclosure is not intended to limit the scope of the disclosure, as claimed, but is merely representative of possible embodiments of the disclosure. In addition, the steps of a method do not necessarily need to be executed in any specific order, or even sequentially, nor need the steps be executed only once, unless otherwise specified.

Embodiments of the systems and methods disclosed herein may balance a battery system by charging and/or discharging different sections of the battery system such that the different sections require a same and/or similar quantum of energy to reach a desired balancing point. As used herein, a battery section may refer to any subset of a battery system including, for example, one or more battery cells included in the system. To balance an individual section of a battery pack, one or more battery cells included the section may be balanced. To balance multiple sections of the battery pack together, the battery cells included in the multiple sections may all be balanced as a group. Accordingly, as used herein, balancing a section or sections includes balancing one or more constituent battery cells of the section or sections. Properly balancing a battery system may increase the lifetime of the battery system and may prevent over and/or undercharging conditions.

Figure 1:
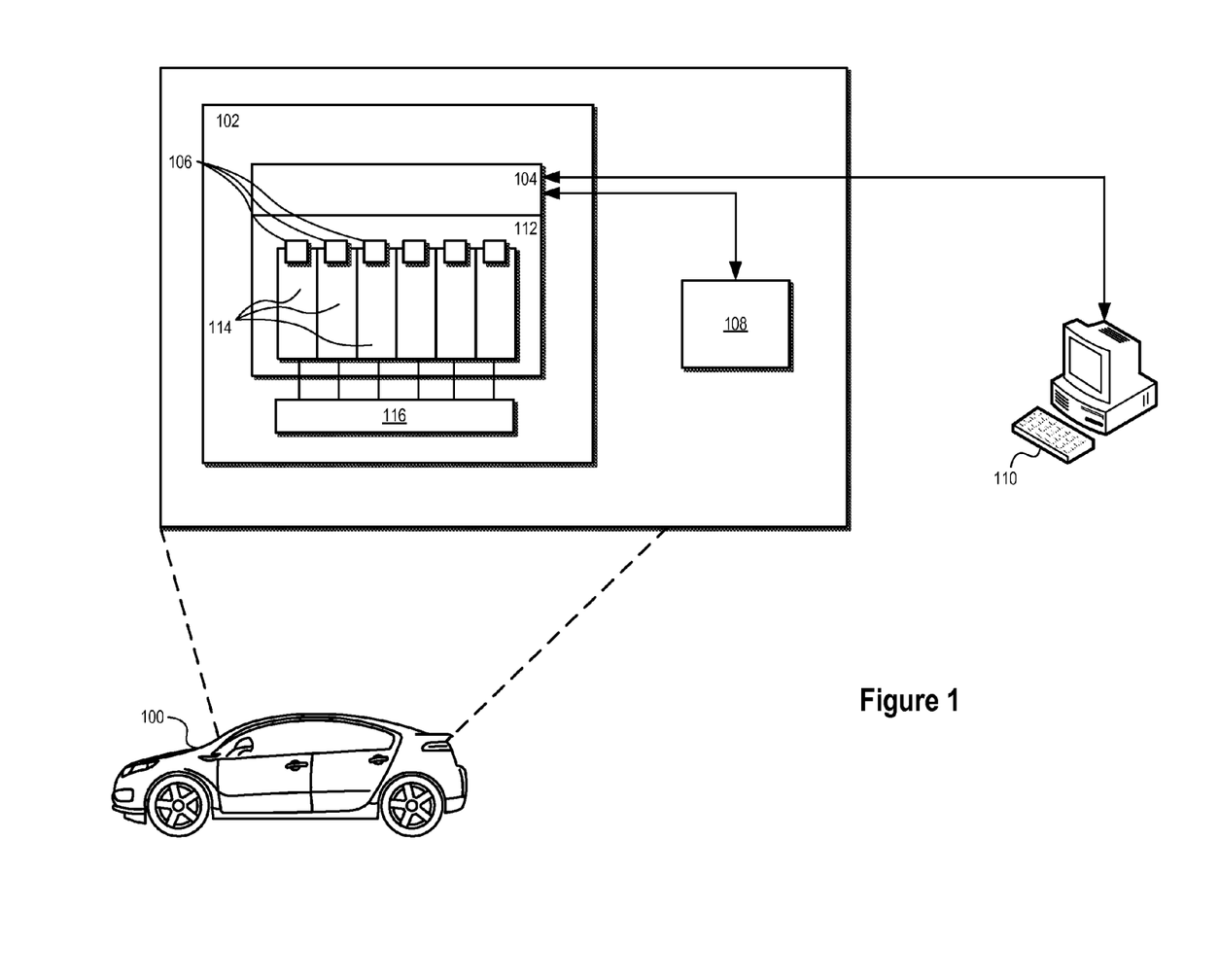
FIG. 1 illustrates an exemplary system for balancing a battery system in a vehicle consistent with embodiments disclosed herein.

FIG. 1 illustrates an exemplary system for balancing a battery system in a vehicle 100 consistent with embodiments disclosed herein. The vehicle 100 may be a motor vehicle, a marine vehicle, an aircraft, and/or any other type of vehicle, and may include an internal combustion engine ("ICE") drivetrain, an electric motor drivetrain, a hybrid engine drivetrain, a FC drivetrain, and/or any other type of drivetrain suitable for incorporating the systems and methods disclosed herein. The vehicle 100 may include a battery system 102 that, in certain embodiments, may be a HV battery system. The HV battery system may be used to power electric drivetrain components (e.g., as in an electric, hybrid, or FC power system). In further embodiments, the battery system 102 may be a low voltage battery (e.g., a lead-acid 12V automotive battery) and may be configured to supply electric energy to a variety of vehicle 100 systems including, for example, vehicle starter systems (e.g., a starter motor), lighting systems, ignition systems, and/or the like.

The battery system 102 may include battery electronics 104. The battery electronics 104 may be configured to monitor and control certain operations of the battery system 102. For example, the battery electronics 104 may be configured to monitor and control charging, discharging, and/or balancing operations of the battery system 102. In certain embodiments, the battery electronics 104 may be communicatively coupled with one or more sensors (e.g., sensors 106), actuation devices (e.g., electrical relays), and/or systems configured to enable the battery electronics 104 to monitor and control operations of the battery system 102. The battery electronics 104 may further be configured to provide information to and/or receive information from other systems included in the vehicle 100. For example, the battery electronics 104 may be communicatively coupled with an internal vehicle computer system 108 and/or an external computer system 110 (e.g., via a wireless telecommunications system or the like). In certain embodiments, the battery electronics 104 may be configured, at least in part, to provide information regarding the battery system 102 to a user of the vehicle 100, vehicle computer system 108, and/or external computer system 110. Such information may include, for example, battery state of charge information, battery operating time information, battery operating temperature information, and/or any other information regarding the battery system 102.

The battery system 102 may include one or more battery packs 112 suitably sized to provide electrical power to the vehicle 100. Each battery pack 112 may include one or more battery sections 114. The battery sections 114 may comprise one or more battery cells utilizing any suitable battery technology including, for example, lead-acid, nickel-metal hydride ("NiMH"), lithium-ion ("Li-Ion"), Li-Ion polymer, lithium-air, nickel-cadmium ("NiCad"), valve-regulated lead-acid ("VRLA") including absorbed glass mat ("AGM"), nickel-zinc ("NiZn"), molten salt (e.g., a ZEBRA battery), and/or other suitable battery technologies. To balance an individual section 114 of battery pack 112, one or more battery cells included the section 114 may be balanced. To balance multiple sections 114 of the battery pack 112 together, the battery cells included in the multiple sections may all be balanced as a group. Accordingly, as used herein, balancing a section or sections 114 may include balancing one or more constituent battery cells of the section or sections 114.

Each battery section 114 and or cells included in the battery sections 114 may be communicatively coupled to a cell balancing system 116. Cell balancing system 116 may be configured to selectively transfer energy to, from, and/or between individual cells included in battery sections 114. For example, cell balancing system 116 may include a network of switches and/or gates configured to facilitate selective energy transfer to, from, and/or between cells of battery sections 114. In certain embodiments, each section 114 may be associated with a discrete cell balancing system 116 configured to facilitate selective energy transfer to, from, and/or between its constituent cells. In further embodiments, multiple sections 114 may be associated with a single cell balancing system 116. Certain functionality of the cell balancing system 116 may be controlled by battery electronics 104, vehicle computer system 108, and/or computer system 110.

Each battery section 114 may be associated with a sensor 106 configured to measure an electrical parameter of an associated battery section 114. Although FIG. 1 illustrates separate sensors 106 associated with each battery section 114, in some embodiments a single sensor configured to measure electrical parameters of a plurality of sections 114 may also be utilized. State of charge information may be determined using information from sensors 106. The determined state of charge may be provided to battery electronics 104. Using the state of charge information, battery electronics 104 and/or any other suitable system may coordinate battery balancing operations as detailed below.

In certain embodiments, battery balancing operations may be performed upon startup of the vehicle 100, vehicle computer 108, and/or battery system 102. In other embodiments, battery balancing operations may be performed when the vehicle 100 and/or battery system 102 are not in use. In further embodiments, battery balancing operations may be performed upon the installation of a new battery section 114 and/or the replacement of an old battery section 114.

Battery balancing may begin by determining states of charge of a plurality of battery sections 114. A quantum of energy to reach a desired state of charge balance point for the battery system may be calculated for each of the plurality of sections. In certain embodiments, a quantum of energy may be expressed in terms of ampere-hours ("AHr") required to reach the desired state of charge balance point. Based on the estimated states of charge and/or the calculated quanta of energy, it may be determined that the battery sections 114 are balanced/unbalanced. For example, if the estimated states of charge and/or the calculated quanta of energy are the same and/or similar (e.g., within a particular range), it may be determined that that the battery sections 114 are balanced. If the battery sections 114 are balanced, balancing operations may not be required. If, however, the battery sections 114 are unbalanced, balancing operations may proceed.

As discussed in more detail below in reference to FIG. 2, one or more battery sections 114 may be identified having calculated quanta of energy (e.g., calculated in terms of AHr) required to reach the desired state of charge balance point that is different (e.g., greater or smaller) than other battery sections. For example, in a battery system 102 having three sections 114, a first section and a second section may be associated with the same quantum of energy required to reach a desired balance point (e.g., 20 AHr). A third section may be associated with a smaller quantum of energy required to reach the desired balance point (e.g., 15 AHr). The third section may be discharged (e.g., by 5 AHr) so that all battery sections 114 require the same quantum of energy (e.g., 20 AHr) to reach a desired state of charge balancing point. In this manner, upon charging the battery system to the desired state of charge balancing point (e.g., a charge termination level), all sections of the battery system will be at or near the balancing point and the battery system will be balanced.

In certain embodiments, information regarding battery balancing operations may be provided by battery electronics 104 to vehicle computer system 108, and/or external computer system 110. For example, an indication regarding the balance/imbalance between one or more battery sections 114 and/or battery pack 112 of battery system 102 may be provided. With this information, a user of the vehicle 100 and/or external computer system 110 may diagnose potential problems with battery system 102, monitor the effectiveness of balancing operations, and/or perform any other suitable diagnostic, monitoring, and/or control activities.

Figure 2:
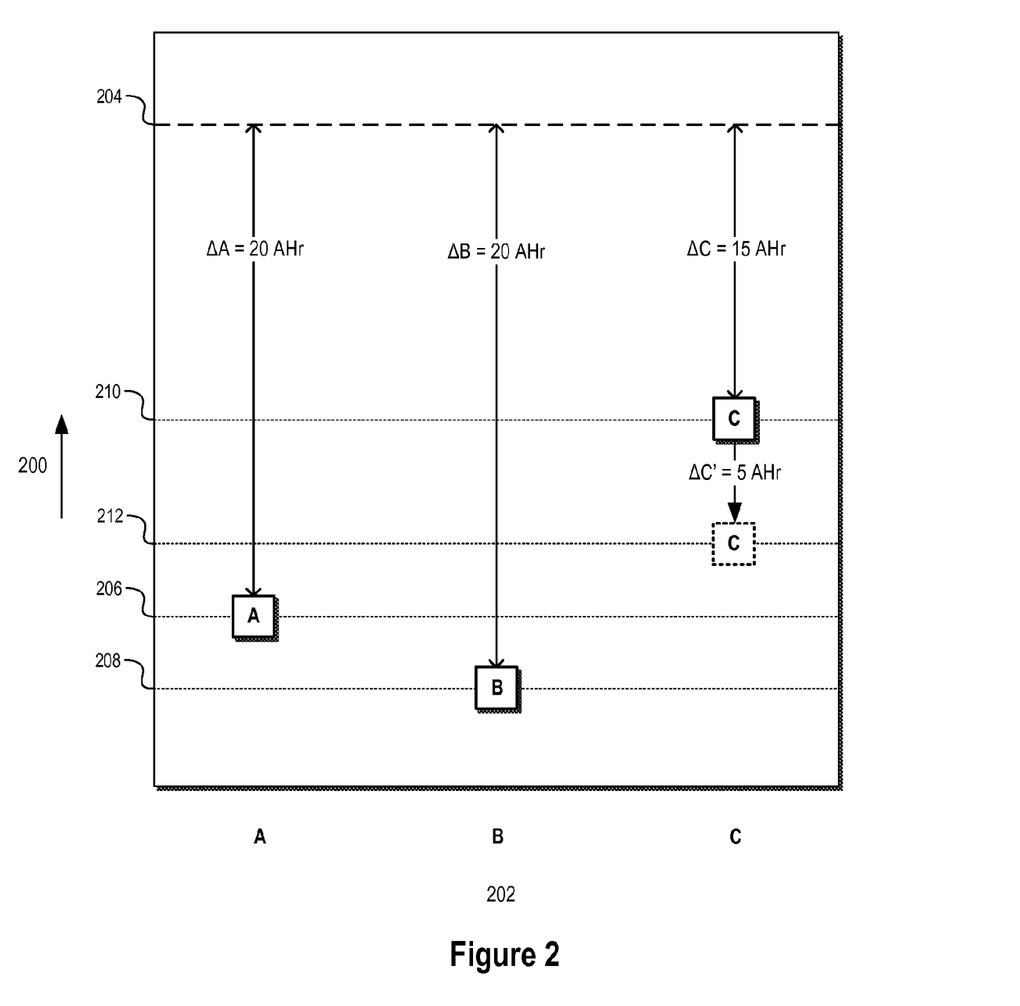
FIG. 2 is a conceptual graph illustrating exemplary methods for balancing a battery system consistent with embodiments disclosed herein.

FIG. 2 is a conceptual graph illustrating exemplary methods for balancing a battery system consistent with embodiments disclosed herein. Particularly, the graph of FIG. 2 illustrates a state of charge window representing varied states of charge 200 for exemplary sections 202 (e.g., sections A, B and C) under three different states of charge conditions. For example, Section A of the exemplary sections 202 may have a first state of charge 206, Section B of the exemplary sections 202 may have a second state of charge 208, and Section C of the exemplary sections 202 may have a third state of charge 210.

A quantum of energy to reach a desired state of charge balance point 204 for the battery system may be calculated for each of the sections 202. In certain embodiments, a quantum of energy may be expressed in terms of ampere-hours ("AHr") required to reach the desired state of charge balance point 204 that, in certain embodiments, may be a charge termination level for the battery system. For example, as illustrated, Section A of the exemplary sections 202 may be associated with a quantum of energy ($\Delta A$) of 20 AHr, Section B of the exemplary sections 202 may be associated with a quantum of energy ($\Delta B$) of 20 AHr, and Section C of the exemplary sections 202 may be associated with a quantum of energy ($\Delta C$) of 15 AHr. In certain, embodiments, two or more sections may require the same quanta of energy to reach the state of charge balance point 204 but nevertheless have different associated states of charge due to different section capacities (e.g., Sections A and Section B illustrated in FIG. 2). In further embodiments, sections having the same states of charges may be associated with the same quanta of energy to reach to the state of charge balance point 204.

Based on the states of charge 206-210 and/or the calculated quanta of energy (e.g., $\Delta A$, $\Delta B$, and $\Delta C$), it may be determined that the sections 202 are either balanced or unbalanced. For example, if the estimated states of charge 206-210 and/or the calculated quanta of energy are the same and/or similar (e.g., within a particular range), it may be determined that that the battery sections 202 are balanced. If the battery sections 202 are balanced, balancing operations may not be required. If, however, the battery sections 202 are unbalanced, as illustrated in FIG. 2, balancing operations may proceed.

One or more battery sections may be identified having calculated quanta of energy required to reach the desired state of charge balance point 204 that that are different (e.g., greater or smaller) than other battery sections. For example, as illustrated, Section C may have an associated quantum of energy (e.g., $\Delta C=15$ AHr) that is different that the quanta of energy associated with Section A and Section B (e.g., $\Delta A \approx \Delta B \approx 20$ AHr). Section A, Section B, and/or Section C may then be charged and or discharged such that the quanta of energy associated with the sections are the same or similar (e.g., $\Delta A \approx \Delta B \approx \Delta C \approx \Delta 20$ AHr). For example, as illustrated, Section C may be discharged by a quantum of energy ($\Delta C'$) of 5 AHr to state of charge level 212 such that the quanta of energy associated with the sections are the same or similar (e.g., $\Delta A \approx \Delta B \approx \Delta C \approx 20$ AHr). In this manner, upon charging the battery system to the desired state of charge balancing point 204, all sections 202 of the battery system will be at or near the balancing point 204 and the battery system will be balanced.

Figure 3:
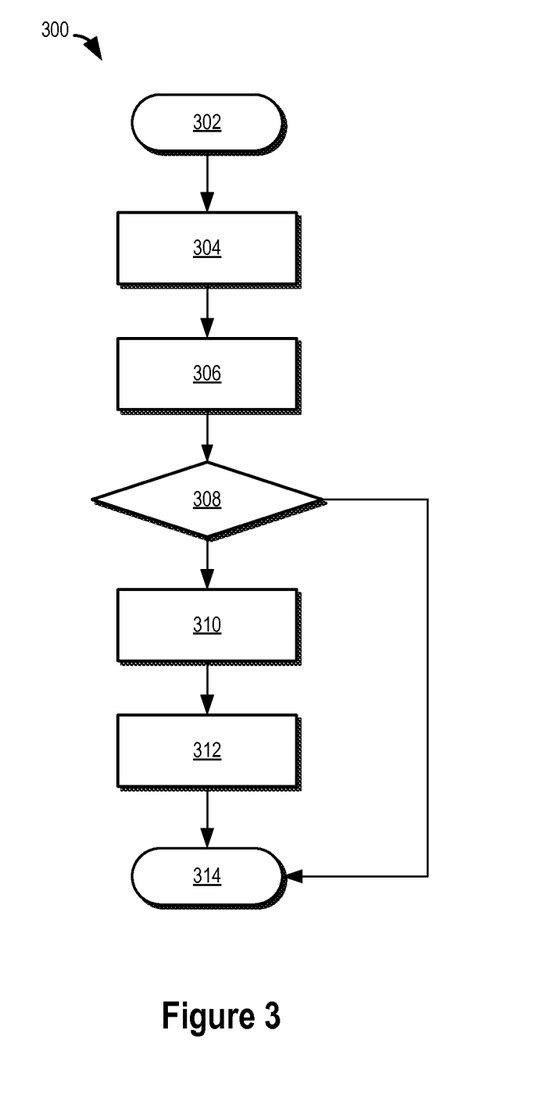
FIG. 3 illustrates a flow chart of an exemplary method for balancing a battery system in a vehicle consistent with embodiments disclosed herein.

FIG. 3 illustrates a flow chart of an exemplary method 300 for balancing a battery system in a vehicle consistent with embodiments disclosed herein. The illustrated method 300 may be performed using, at least in part, battery electronics, a cell balancing system, a vehicle computer system, and/or an external computer system. At 302, the method 300 may be initiated. At 304, state of charge measurements associated with a plurality of battery sections of a battery system may be received. In certain embodiments, the state of charge measurements may be determined using one or more sensors associated with the plurality of battery sections.

At 306, a quantum of energy to reach a desired state of charge balance point may be calculated for each of the plurality of sections. In certain embodiments, the balance point may be a charge termination point. At 308, based on the states of charge and/or the calculated quanta of energy, a determination may be made whether the plurality of battery sections require balancing. In certain embodiments, determining whether the battery is unbalanced may include comparing the estimated states of charge and/or the calculated quanta of energy to determine whether the battery sections are balanced/unbalanced.

In certain embodiments, the determination may be made by determining that measured states of charge of the plurality of battery sections and/or the calculated quanta of energy are not the same or are not within a particular range. If the state of charge measurements and/or the calculated quanta of energy associated with the plurality of battery sections are the same, or are within a particular range, battery balancing operations may not be required (e.g., the battery may be already balanced) and the method 300 may terminate at 314. If the state of charge measurements are not the same or within the particular range, the method 300 may proceed to 310.

At 310, one or more battery sections may be identified having associated calculated quanta of energy that are different than calculated quanta of energy of other battery sections. At 312, energy may be transferred to and/or removed from one or more of the battery sections such that all the battery sections have the same or similar calculated quanta of energy required to reach the desired state of charge balancing point. In this manner, upon charging the battery system to the desired state of charge balancing point, all sections of the battery system will be at or near the balancing point and the battery system will be balanced.

Figure 4:
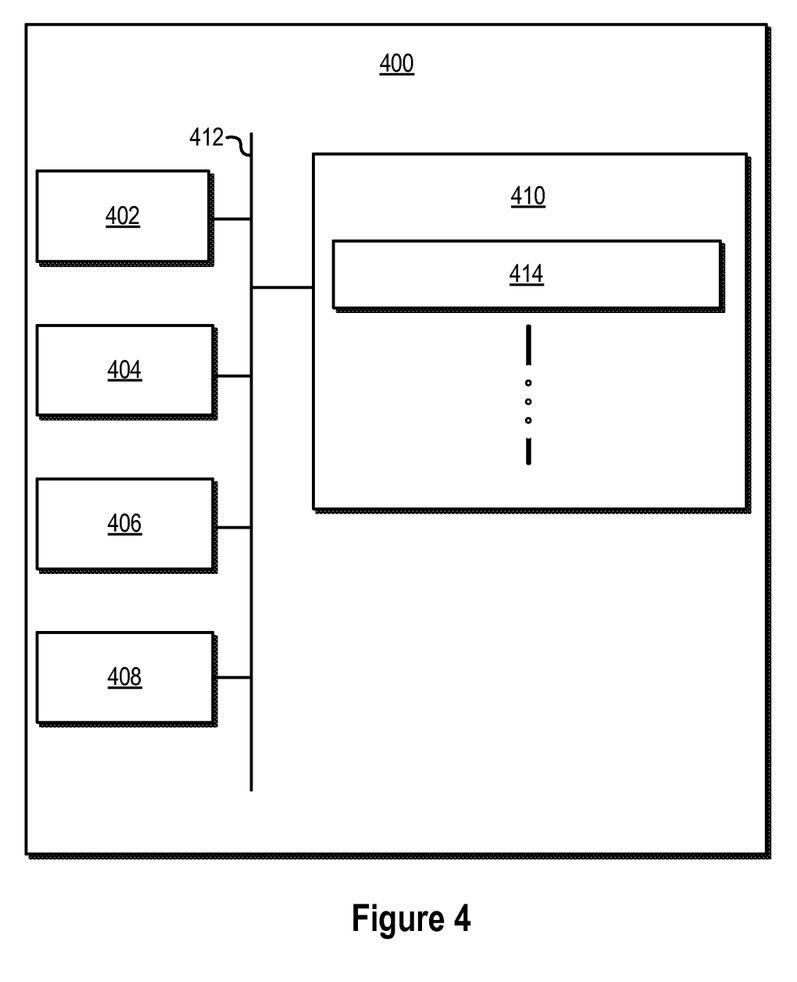
FIG. 4 illustrates a block diagram of a computer system for implementing various embodiments consistent with embodiments disclosed herein.

FIG. 4 illustrates a block diagram of a computer system 400 that may be utilized in implementing certain embodiments of the systems and methods disclosed herein. In certain embodiments, the computer system 400 may be a personal computer system, a server computer system, an on-board vehicle computer, an FC control system, and/or any other type of system suitable for implementing the disclosed systems and methods. In further embodiments, the computer system 400 may be any portable electronic computer system or electronic device including, for example, a notebook computer, a smartphone, and/or a tablet computer.

As illustrated, the computer system 400 may include, among other things, one or more processors 402, random access memory (RAM) 404, a communications interface 406, a user interface 408, and a non-transitory computer-readable storage medium 410. The processor 402, RAM 404, communications interface 406, user interface 408, and computer-readable storage medium 410 may be communicatively coupled to each other via a common data bus 412. In some embodiments, the various components of the computer system 400 may be implemented using hardware, software, firmware, and/or any combination thereof.

User interface 408 may include any number of devices allowing a user to interact with the computer system 400. For example, user interface 408 may be used to display an interactive interface to a user. The user interface 408 may be a separate interface system communicatively coupled with the computer system 400 or, alternatively, may be an integrated system such as a display interface for a laptop, a display integrated into a vehicle, or other similar device. In certain embodiments, the user interface 408 may be produced on a touch screen display. The user interface 408 may also include any number of other input devices including, for example, keyboard, trackball, and/or pointer devices.

The communications interface 406 may be any interface capable of communicating with other computer systems, peripheral devices, and/or other equipment communicatively coupled to computer system 400. For example, the communications interface 406 may allow the computer system 400 to communicate with other computer systems (e.g., computer systems associated with external databases and/or the Internet), allowing for the transfer as well as reception of data from such systems. The communications interface 406 may include, among other things, a modem, a satellite data transmission system, an Ethernet card, and/or any other suitable device that enables the computer system 400 to connect to databases and networks, such as LANs, MANs, WANs and the Internet.

Processor 402 may include one or more general purpose processors, application specific processors, programmable microprocessors, microcontrollers, digital signal processors, FPGAs, other customizable or programmable processing devices, and/or any other devices or arrangement of devices that are capable of implementing the systems and methods disclosed herein.

Processor 402 may be configured to execute computer-readable instructions stored on non-transitory computer-readable storage medium 410. Computer-readable storage medium 410 may store other data or information as desired. In some embodiments, the computer-readable instructions may include computer executable functional modules 414. For example, the computer-readable instructions may include one or more functional modules 414 configured to implement all or part of the functionality of the systems and methods described above. Specific functional models 414 that may be stored on computer-readable storage medium 410 include a battery balancing module. A battery balancing module may implement, at least in part, the battery balancing functionality described in connection with various embodiments of the present disclosure.

The system and methods described herein may be implemented independent of the programming language used to create the computer-readable instructions and/or any operating system operating on the computer system 400. For example, the computer-readable instructions may be written in any suitable programming language, examples of which include, but are not limited to, C, C++, Visual C++, and/or Visual Basic, Java, Perl, or any other suitable programming language. Further, the computer-readable instructions and/or functional modules may be in the form of a collection of separate programs or modules, and/or a program module within a larger program or a portion of a program module. The processing of data by computer system 400 may be in response to user commands, results of previous processing, or a request made by another processing machine. It will be appreciated that computer system 400 may utilize any suitable operating system including, for example, Unix, DOS, Android, Symbian, Windows, iOS, OSX, Linux, and/or the like.

Although the foregoing has been described in some detail for purposes of clarity, it will be apparent that certain changes and modifications may be made without departing from the principles thereof. Similarly, the battery electronics may be configured to incorporate certain features and/or functionality of the cell balancing system. Similarly, certain features of the embodiments disclosed herein may be configured and/or combined in any suitable configuration or combination. Additionally, certain systems and/or methods disclosed herein may be utilized in battery systems not included in a vehicle (e.g., a backup power battery system or the like). It is noted that there are many alternative ways of implementing both the processes and apparatuses described herein. Accordingly, the present embodiments are to be considered illustrative and not restrictive, and the invention is not to be limited to the details given herein, but may be modified within the scope and equivalents of the appended claims.

The foregoing specification has been described with reference to various embodiments. However, one of ordinary skill in the art will appreciate that various modifications and changes can be made without departing from the scope of the present disclosure. For example, various operational steps, as well as components for carrying out operational steps, may be implemented in alternate ways depending upon the particular application or in consideration of any number of cost functions associated with the operation of the system. Accordingly, any one or more of the steps may be deleted, modified, or combined with other steps. Further, this disclosure is to be regarded in an illustrative rather than a restrictive sense, and all such modifications are intended to be included within the scope thereof. Likewise, benefits, other advantages, and solutions to problems have been described above with regard to various embodiments. However, benefits, advantages, solutions to problems, and any element(s) that may cause any benefit, advantage, or solution to occur or become more pronounced, are not to be construed as a critical, a required, or an essential feature or element.

As used herein, the terms "comprises" and "includes," and any other variation thereof, are intended to cover a non-exclusive inclusion, such that a process, a method, an article, or an apparatus that comprises a list of elements does not include only those elements but may include other elements not expressly listed or inherent to such process, method, system, article, or apparatus. Also, as used herein, the terms "coupled," "coupling," and any other variation thereof are intended to cover a physical connection, an electrical connection, a magnetic connection, an optical connection, a communicative connection, a functional connection, and/or any other connection.

Those having skill in the art will appreciate that many changes may be made to the details of the above-described embodiments without departing from the underlying principles of the invention. The scope of the present invention should, therefore, be determined only by the following claims.

The invention claimed is:

1. A system comprising:
a battery system comprising a plurality of battery sections, each section of the plurality of sections comprising a plurality of cells;
a plurality of sensors coupled to the plurality of sections configured to measure an electrical parameter associated with each of the plurality of sections;
a balancing system coupled to the plurality of sections configured to selectively change amounts of energy stored in the plurality of sections;
battery control electronics communicatively coupled to the plurality of sensors and the balancing system, the battery control electronics being configured to:
determine a state of charge of each of the plurality of sections based upon the electrical parameter,
calculate a plurality of quanta of energy required for each of the plurality of battery sections to reach a charge termination level associated with a charging operation of the battery system balancing point, and
control the balancing system to selectively change the amounts of energy stored in the plurality of sections such that each of the plurality of quanta of energy is within a particular range.

2. The system of claim 1, wherein the battery control electronics are further configured to control the balancing system to selectively change the amounts of energy stored in the plurality of sections such that the plurality of quanta of energy are approximately equal.

3. The system of claim 1, wherein the balancing system is configured to selectively transfer energy from the plurality of sections.

4. The system of claim 3, wherein the battery control electronics are further configured to control the balancing system to selectively discharge energy stored in one or more of the plurality of sections such that the plurality of quanta of energy are within a particular range.

5. The system of claim 1, wherein the balancing system is configured to selectively transfer energy to the plurality of sections.

6. The system of claim 5, wherein the battery control electronics are further configured to control the balancing system to selectively charge one or more of the plurality of sections such that the plurality of quanta of energy are within a particular range.

7. A method for balancing a plurality of sections included in a battery system comprising:
calculating a plurality of quanta of energy required for each of the plurality of sections to reaching a charge termination level associated with a charging operation of the battery system;
determining, based on the calculated plurality of quanta of energy, that the plurality of sections of the battery system are unbalanced; and
selectively actuating a balancing system to change the amounts of energy stored in one or more of the plurality of cells such that the plurality of quanta of energy are within a particular range.

8. The method of claim 7, wherein the method further comprises:
receiving a plurality of state of charge measurements associated with the plurality of sections,
wherein determining that the plurality of sections of the battery systems are unbalanced is further based on the plurality of state of charge measurements.

9. The method of claim 7, wherein selectively actuating the balancing system further comprises selectively actuating the balancing system such that the plurality of quanta of energy are the same.

10. The method of claim 7, wherein selectively actuating the balancing system further comprises selectively actuating the balancing system to transfer energy from one or more of the plurality of sections.

11. The system of claim 7, wherein selectively actuating the balancing system further comprises selectively actuating the balancing system to transfer energy to one or more of the plurality of sections.

12. A non-transitory computer-readable storage medium storing instructions that, when executed by a processor, cause the processor to perform a method comprising:
calculating a plurality of quanta of energy required for each of a plurality of sections included in a battery system to reaching a charge termination level associated with a charging operation of the battery system;
determining, based on the calculated plurality of quanta of energy, that the plurality of sections of the battery system are unbalanced; and
selectively actuating a balancing system to change the amounts of energy stored in one or more of the plurality of cells such that the plurality of quanta of energy are within a particular range.

13. The non-transitory computer-readable storage medium of claim 12, wherein the method further comprises:
receiving a plurality of state of charge measurements associated with the plurality of sections,
wherein determining that the plurality of sections of the battery systems are unbalanced is further based on the plurality of state of charge measurements.

14. The non-transitory computer-readable storage medium of claim 12, wherein selectively actuating the balancing system further comprises selectively actuating the balancing system such that the plurality of quanta of energy are the same.

15. The non-transitory computer-readable storage medium of claim 12, wherein selectively actuating the balancing system further comprises selectively actuating the balancing system to transfer energy from one or more of the plurality of sections.

16. The non-transitory computer-readable storage medium of claim 12, wherein selectively actuating the balancing system further comprises selectively actuating the balancing system to transfer energy to one or more of the plurality of sections.

* * * * *